US007429214B2

(12) United States Patent
Brase et al.

(10) Patent No.: US 7,429,214 B2
(45) Date of Patent: Sep. 30, 2008

(54) ELECTRONIC GAME WITH REAL FEEL INTERFACE

(75) Inventors: Kevin Brase, Corinth, TX (US); Allen Michalik, Dallas, TX (US); Ethan Wood, Dallas, TX (US); Chi Man Ko, Hong Kong (CN); Derek Man, Hong Kong (CN); Chris Park, Hong Kong (CN)

(73) Assignee: Mattel, Inc., El Segundo, CA (US)

( * ) Notice: Subject to any disclaimer, the term of this patent is extended or adjusted under 35 U.S.C. 154(b) by 0 days.

(21) Appl. No.: 11/056,812

(22) Filed: Feb. 10, 2005

(65) Prior Publication Data

US 2005/0227750 A1 Oct. 13, 2005

Related U.S. Application Data

(60) Provisional application No. 60/543,839, filed on Feb. 10, 2004.

(51) Int. Cl.
*A63F 13/00* (2006.01)

(52) U.S. Cl. .............................. 463/1; 463/31; 463/32; 463/33

(58) Field of Classification Search ............. 436/36–37
See application file for complete search history.

(56) References Cited

U.S. PATENT DOCUMENTS

| | | | | | |
|---|---|---|---|---|---|
| 5,704,836 | A | * | 1/1998 | Norton et al. | 463/36 |
| D412,186 | S | * | 7/1999 | Goto | D21/330 |
| 2002/0167699 | A1 | * | 11/2002 | Verplaetse et al. | 359/158 |
| 2003/0199316 | A1 | * | 10/2003 | Miyamoto et al. | 463/35 |
| 2004/0166937 | A1 | * | 8/2004 | Rothschild et al. | 463/36 |
| 2005/0037843 | A1 | * | 2/2005 | Wells et al. | 463/30 |

* cited by examiner

*Primary Examiner*—Corbett Coburn
*Assistant Examiner*—Omkar Deodhar
(74) *Attorney, Agent, or Firm*—Bell, Boyd & Lloyd, LLP

(57) ABSTRACT

The present invention relates to an electronic game, including a housing, electronic circuitry positioned within the housing, and a display unit positioned within the housing and electrically coupled to the circuitry. A first sensor is electrically coupled to the circuitry and when activated initiates a first response from the circuitry. A second sensor electrically coupled to the circuitry and when activated prior to activating the first sensor initiates a second response from the circuitry.

23 Claims, 8 Drawing Sheets

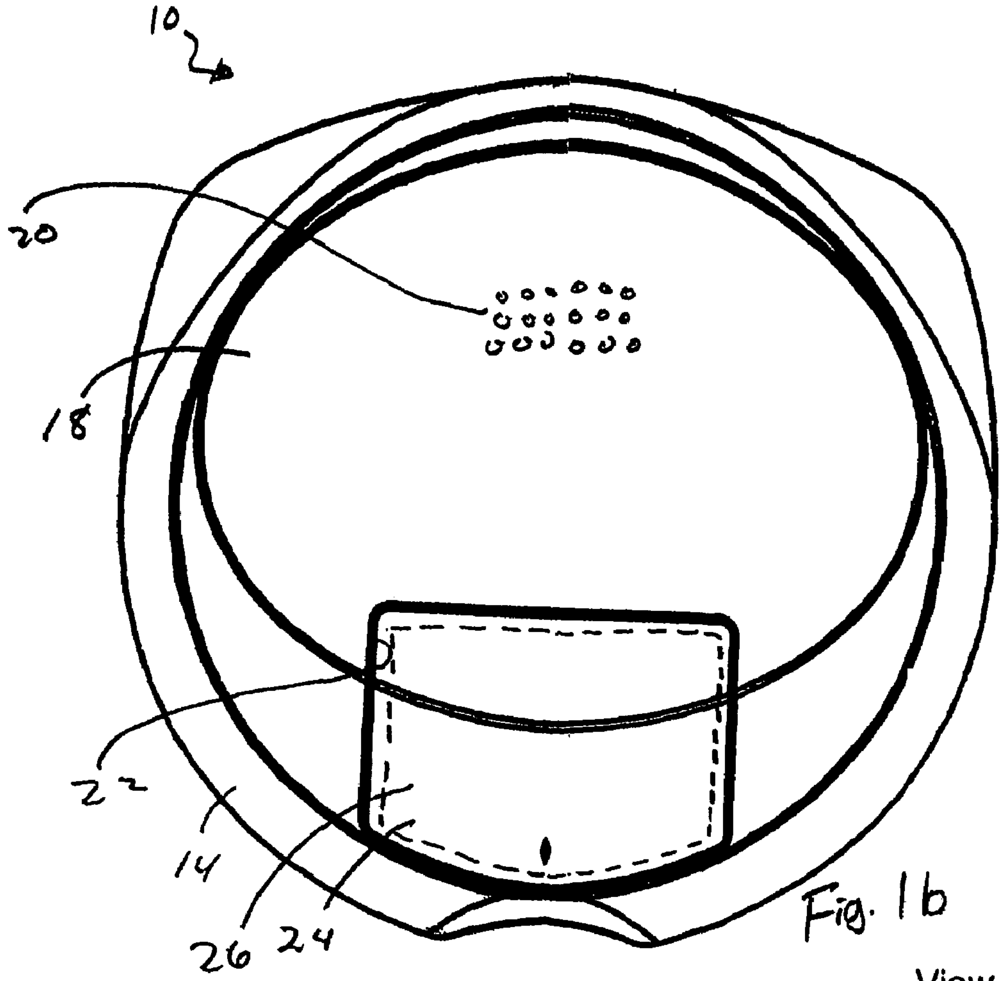
Fig. 1b
Segments: 229 segments.
Fig. 3
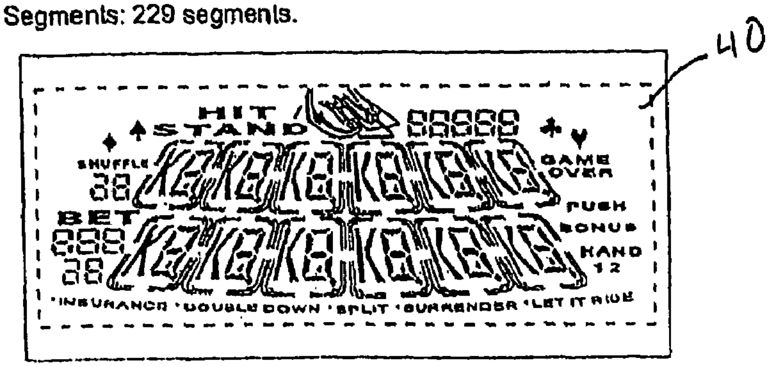

ELECTRONIC GAME WITH REAL FEEL INTERFACE

This application claims the benefit of U.S. Provisional Application Ser. No. 60/543,839, filed Feb. 10, 2004, the entire contents of which are incorporated herein by reference.

FIELD OF INVENTION

The present invention relates to an electronic game that has sensors that allow the game to be played with a "real feel". More particularly, the present invention relates to an electronic game with sensors that allow the game to determine whether the player touches the game playing surface or passes a hand over the game playing surface, thereby dictating the game's process.

BACKGROUND OF INVENTION

With the rapid development of relatively low cost, digital electronic devices including low cost microprocessors and memory devices, a substantial number of different toys and games have been developed. One type of electronic game which has enjoyed great popularity as low cost digital electronic apparatus continue to develop has become generally known in the art as "handheld" games. Such games derive their name from the relatively small size of the housing used to package the game. These devices are, in essence, small enough to be held by the user either in the hand or upon a game play surface such as a table. While various shapes, configurations and sizes of handheld electronic games have been provided, the basic handheld electronic game utilizes a housing, usually small enough to be held, within which a digital electronic circuit including a microprocessor and associated memory is supported together with a plurality of batteries. The housing typically supports a plurality of input buttons or other devices used in game play. Also, within the housing, a sound circuit and sound producing transducer such as a small speaker or piezoelectric device is supported. The typical handheld electronic game also utilizes a small display screen upon which images may be formed. The most frequently used technology for such screens is found in a plurality of liquid crystal display cells or "LCDs". Some handheld games, however, also utilize light emitting diode or "LED" display screens.

The basic game play rules which are used by the microprocessor in playing the game, controlling the displayed images, and responding to user inputs during game play are typically stored in the microprocessor memory. Handheld electronic games are often configured for play by a single user in which the player is, in essence, playing against the microprocessor within the device.

There exist a continuing need to produce electronic games that simulate "real" games and allow improved player interaction.

SUMMARY OF INVENTION

An object of the present invention is to provide an electronic game that has a real feel interface.

Another object of the present invention is to provide an electronic game that has sensors therein that determine the actions of the player, thereby facilitating game play.

Yet another object of the present invention is to provide an electronic game that has at least two sensors that determine whether the user desires one of at least two courses of action, thereby facilitating game play.

These objects are achieved by an electronic game, including a housing, electronic circuitry positioned within the housing, a first sensor electrically coupled to the circuitry and when activated initiates a first response from the circuitry, and a second sensor electrically coupled to the circuitry and when activated prior to activating the first sensor initiates a second response from the circuitry.

These objects are further achieved by an electronic card game, including a housing, a display disposed within the housing for displaying card images, electronic circuitry disposed within the housing and in electronic communication with the display, a first sensor in electrical communication with the electronic circuitry; and a second sensor in electrical communication with the electronic circuitry. Wherein activation of the first sensor without activation of the second sensor communicates to the electronic circuitry that an additional card is to be displayed on the display and activation of the second sensor followed by activation of the first sensor, within a predetermined amount of time, communicates that no additional card is to be displayed.

These objects are further achieved by a method of playing an electronic game, the game including electronic circuitry, an electronic display disposed within a housing and in communication with the electronic circuitry, a first motion sensor and a second motion sensor, each motion sensor in communication with the electronic circuitry, the method including the steps of activating the electronic display, interpreting the electronic display, activating the first motion sensor without activating the second motion sensor within a first predetermined amount of time, thereby sending a first signal to the electronic circuitry which in turn initiates a first display and activating the first and the second motion sensors within a second predetermined amount of time, thereby sending a second signal to the electronic circuitry which in turn initiates a second display.

Additional features and advantages of the present invention are described in, and will be apparent from, the following Detailed Description of the Invention and the figures.

BRIEF DESCRIPTION OF THE FIGURES

Referring to the drawings which form a part of this disclosure:

FIG. 1*b* illustrates a bottom plan view of an electronic game according to a preferred embodiment of the present invention;

FIG. 3 is a enlarged view of the LCD layout for the electronic game of FIG. 1*a;*

DETAILED DESCRIPTION OF THE INVENTION

FIGS. 1*a*-5D illustrate an electronic game 10 according to the present invention. Electronic game 10 is preferably a hand held electronic version of the card game Blackjack or twenty-one; however, game 10 can be any suitable electronic game. Electronic game 10 is preferably formed from plastic and has a generally circular housing. The housing has an upper portion 12 and a lower portion 14 that are coupled together and house all of the game playing electronics; however the housing can be any shape, material or configuration desired. It is noted also that game 10 can have any configuration or number of housing portions desired.

Figure 2:
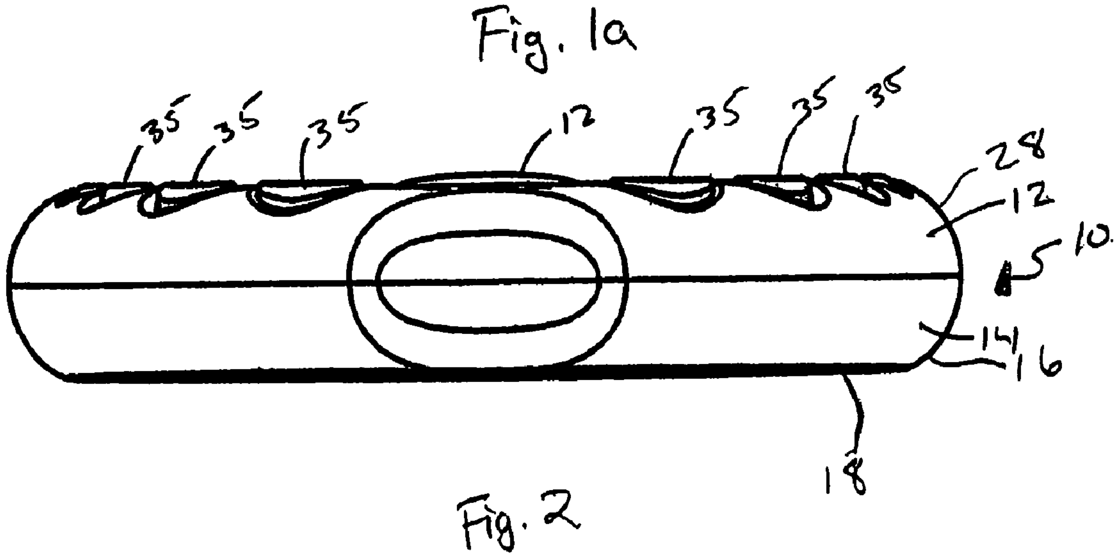
FIG. 2 is a elevational side view of the of the electronic game of FIGS. 1*a* and 1*b;*

As shown in FIG. 2, the lower or back housing portion 14 has a curved edge 16 and a main housing back surface 18. The main housing back has a speaker area 20 and an aperture 22 with a battery door 24 that allows access to the battery compartment 26; however it is noted that device 10 can be powered by any suitable means.

The front and back housing portions are sized and configured to house all of the electronics of the present invention. For example, all the circuitry, including a microprocessor, memory, an LCD display three sensors, a power supply and various other suitable and/or necessary components are all housed between the front and back housing portions. It is not necessary for all electronics to be completely situated within the housing and the electronics can be situated in any manner desired.

Figure 1A:
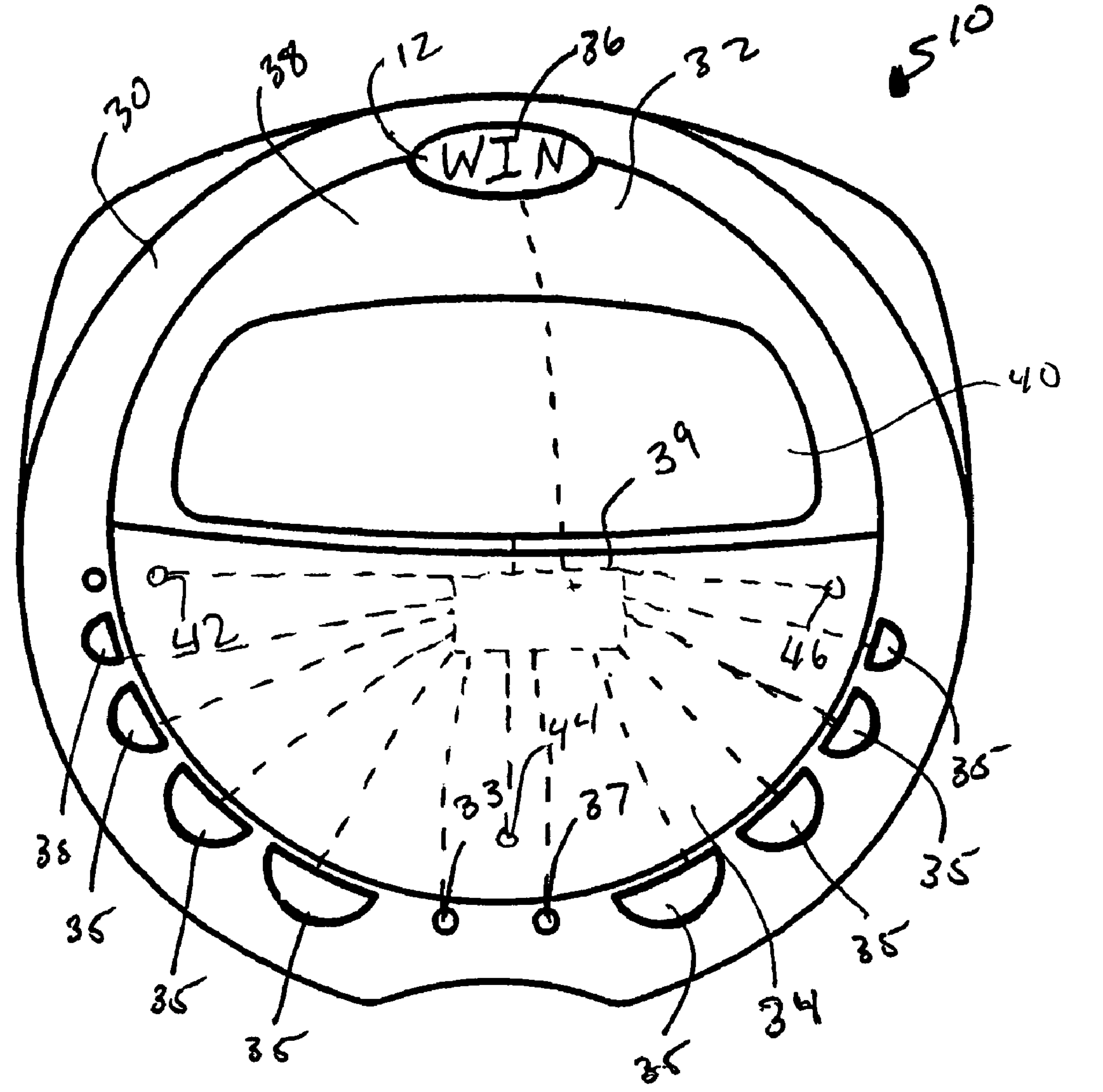
FIG. 1*a* illustrates a top plan view of an electronic game according to a preferred embodiment of the present invention.

As shown in FIGS. 1*a*, 1*b* and 2, the upper or front housing portion 12 has a curved edge 28, a circumferential area 30, an upper area 32 and a lower area 34. Area 30 substantially surrounds areas 32 and 34 and has several buttons 35 thereon. For example, area 30 can have surrender, insure/shuffle, bet/ride, on/deal/hit, stand, double, split, sound and reset buttons thereon. Each of these buttons is preferably a semicircle but can be any configuration desired. Additionally, adjacent the circumferential area and the upper area is a "win" LED 36 that is positioned behind the upper housing portion or translucent cover 12. Furthermore, opposite the "win" LED on the circumferential area 30 are two distance sensors 33 and 37. The above buttons, sensors and LEDs can be positioned in any suitable position on the game or housing portions.

The upper portion or area 32 is preferably a semicircle (or any other suitable configuration) and includes a logo pad print 38 and an LCD area 40. The area 40 is a transparent portion of area 32 that allows an LCD positioned between the housing portions 12 and 14 to display graphics and text to the user, as shown in FIG. 3. For example, in the preferred embodiment, the display graphics illustrate a game of blackjack between the dealer (i.e., the computer) and the user. Of course as discussed herein, the display 40 can display any suitable graphics or other means for a game or other device.

The LCD area 40 displays substantially all of the graphics and information to be displayed to the player. For example, the LCD area displays the cards played, the score, the player's choices and the status of the game. This list is not meant to be exhaustive and the LCD area can display any suitable information. The LCD is in communication with a circuit or a processor 39 that makes decisions based on the input from the player and a random selection of cards to make the game playing as realistic as possible. It is noted the connection between the circuit or processor 39 and the LCD, buttons 35 and sensors is merely exemplary to show that each user interface, display or other portion of the present invention connects in some way to the internal circuitry and the circuit or processor 39. The figures illustrating the internal circuitry and circuit or processor 39 are not meant to limit the manner in which the internal circuitry of the present invention is configured. In fact the internal circuitry and circuit or processor 39 can be configured in any manner desired.

The lower area 34 is preferably a semicircle and is configured to look and feel like a casino Blackjack playing surface. For example, the lower area is configured to look and feel like a felt pad with color graphics; however, the lower area can be any suitable configuration for any suitable electronic game. As shown in FIG. 1*a*, the lower area allows access to three separate sensors. Sensors 42 and 46 are in the two upper corners of the lower area and sensor 44 is positioned adjacent the circumferential area equidistant from sensors 42 and 46; however, the sensors can number any suitable number and be positioned in any manner desired. Each of the three sensors is preferably a light or infrared (IR) sensor or any other sensor that can determine motion and/or change in light.

The sensors are in communication with the electronic circuitry and the circuit or processor 39, which as discussed above makes decisions based on the player input, including information from sensors 42, 44 and 46 and a random selection of cards.

Figure 4A:
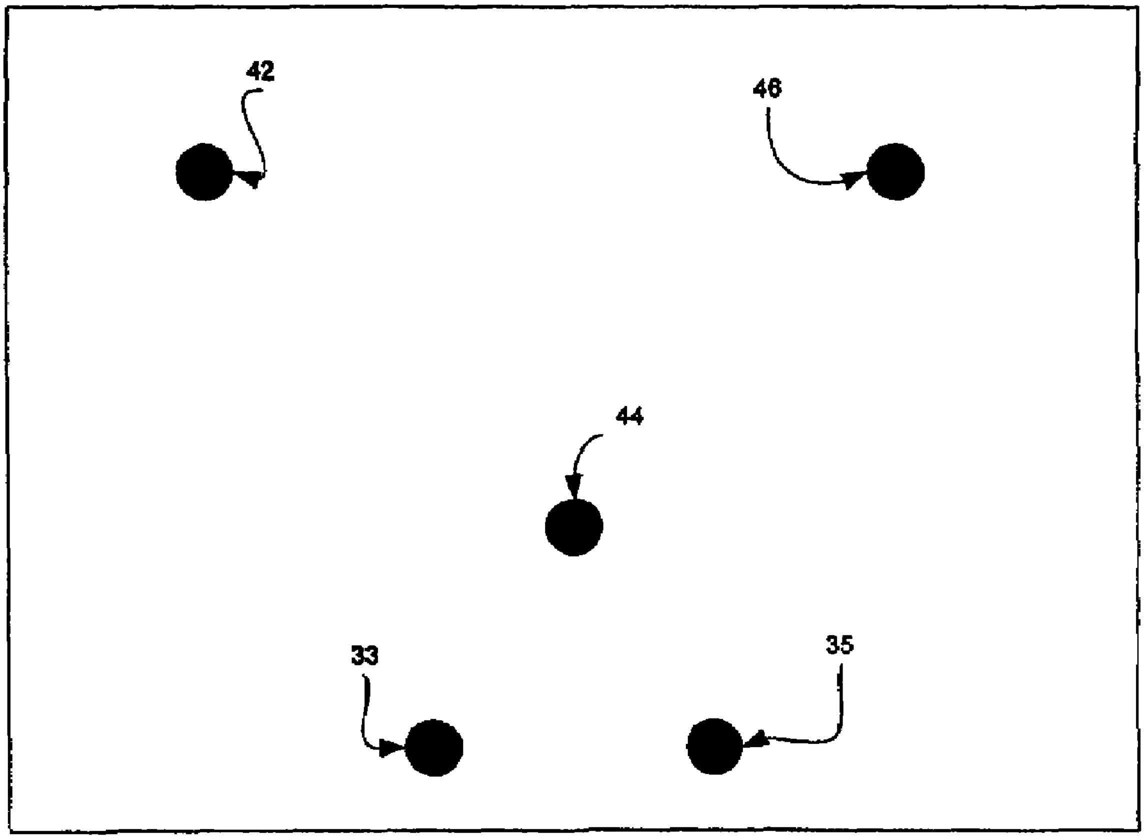
FIG. 4A is a schematic view of the sensors used in the electronic game of FIG. 1 for determining the choices of a player.
Figure 4B:
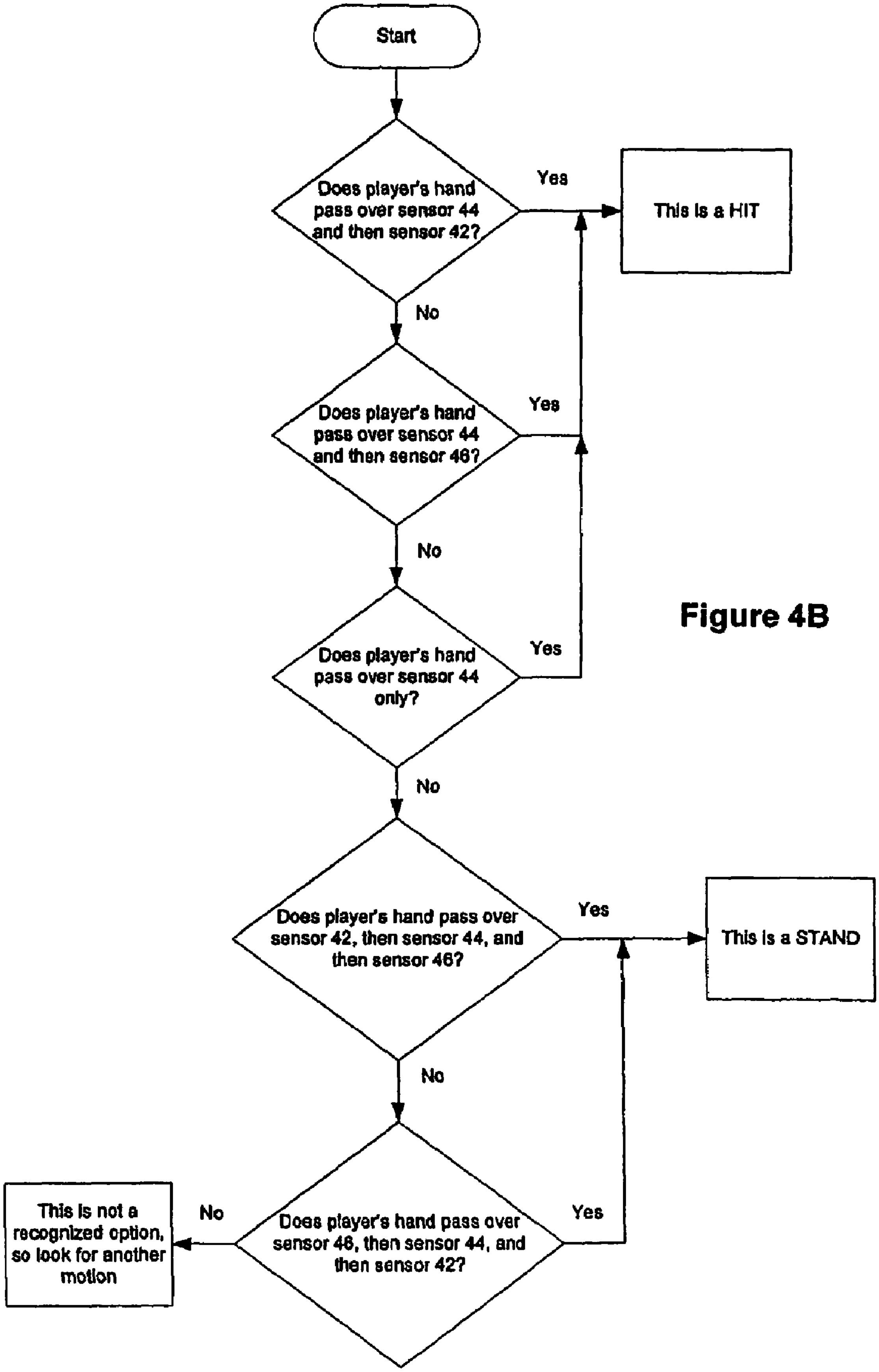
FIG. 4B is a flow diagram of the process of determining "hit" or "stand" input from the sensors from FIG. 4A.
Figure 5A:
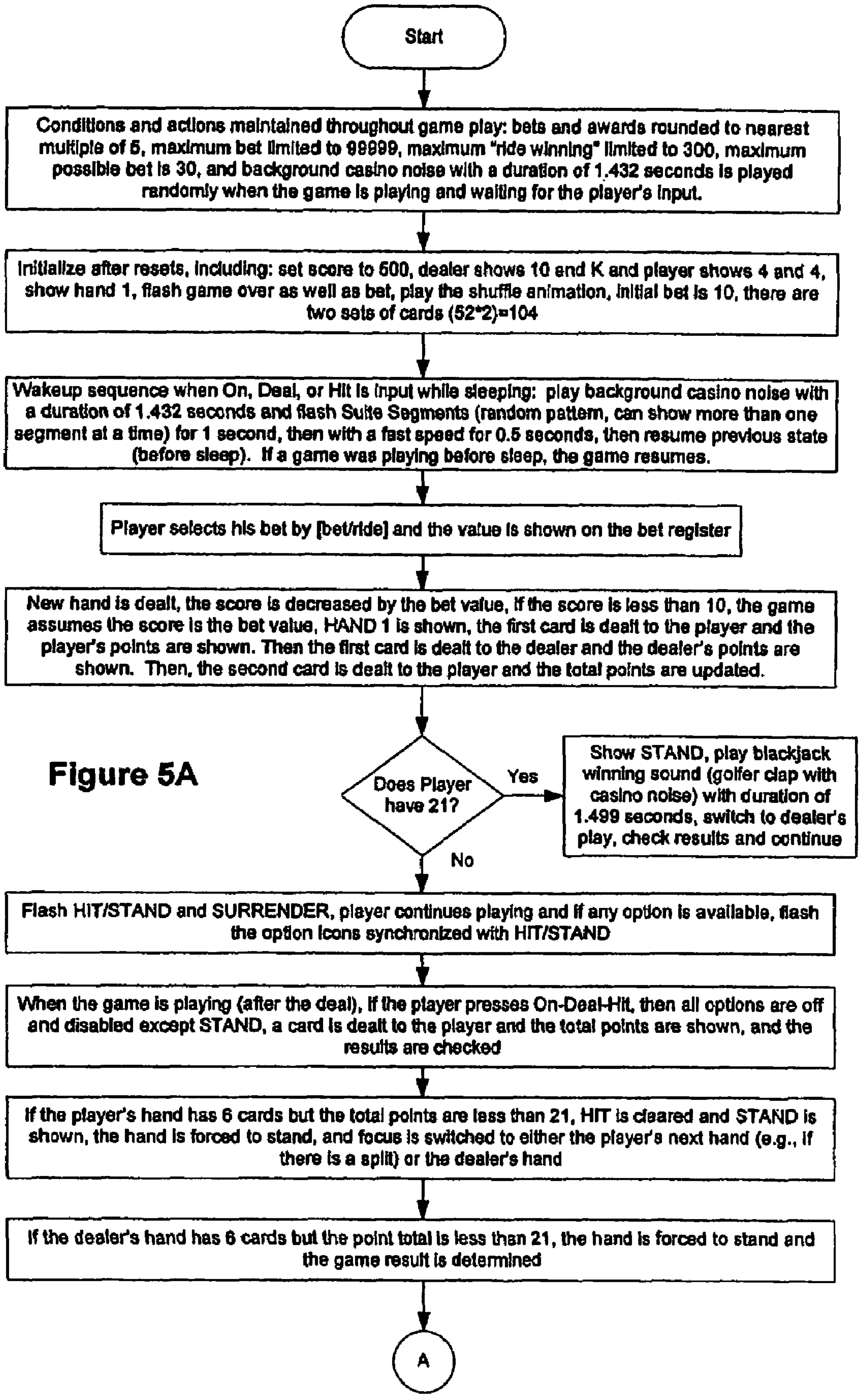
FIGS. 5A-D are flow diagrams illustrating examples of game play.
Figure 5B:
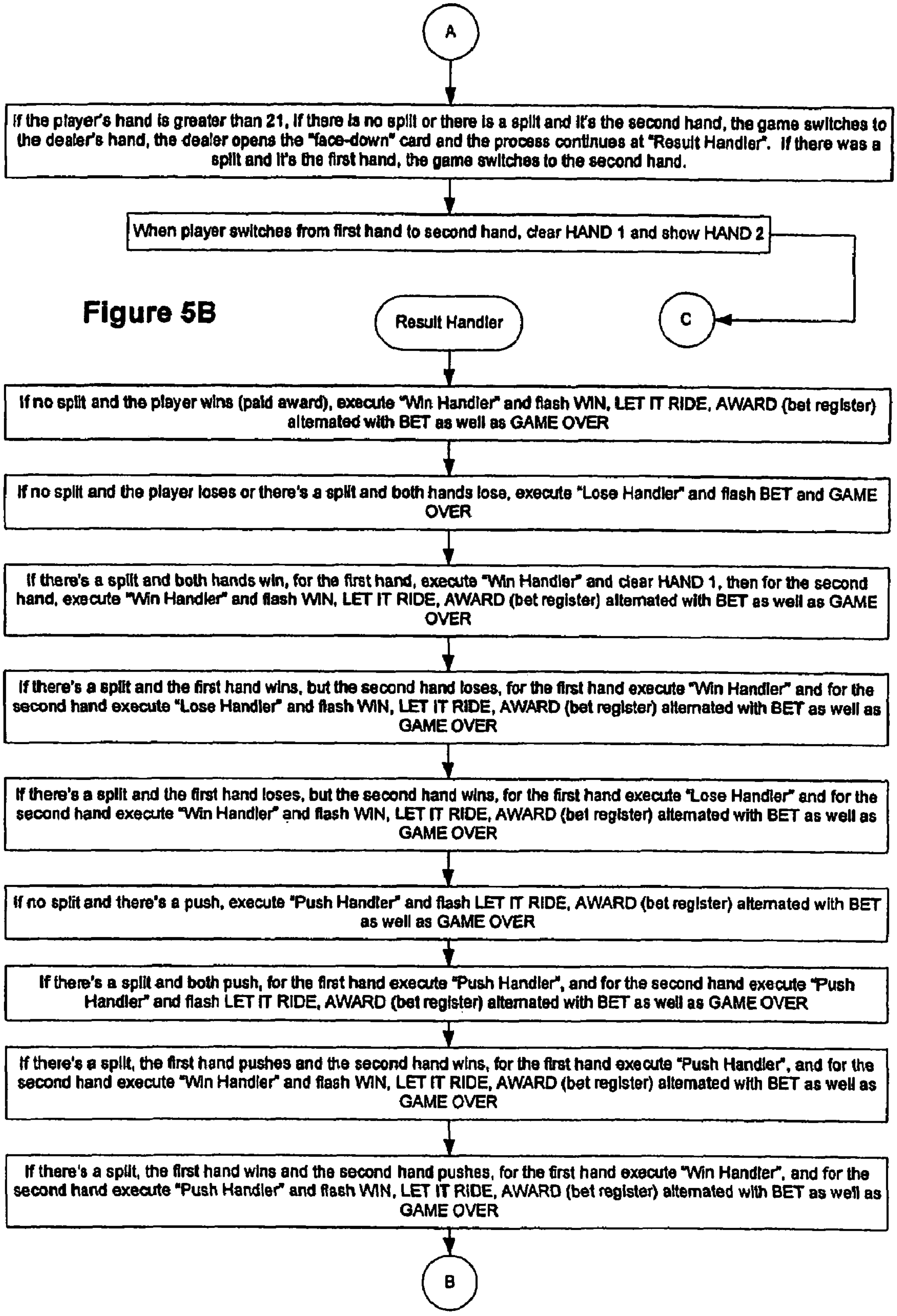
Figure 5C:
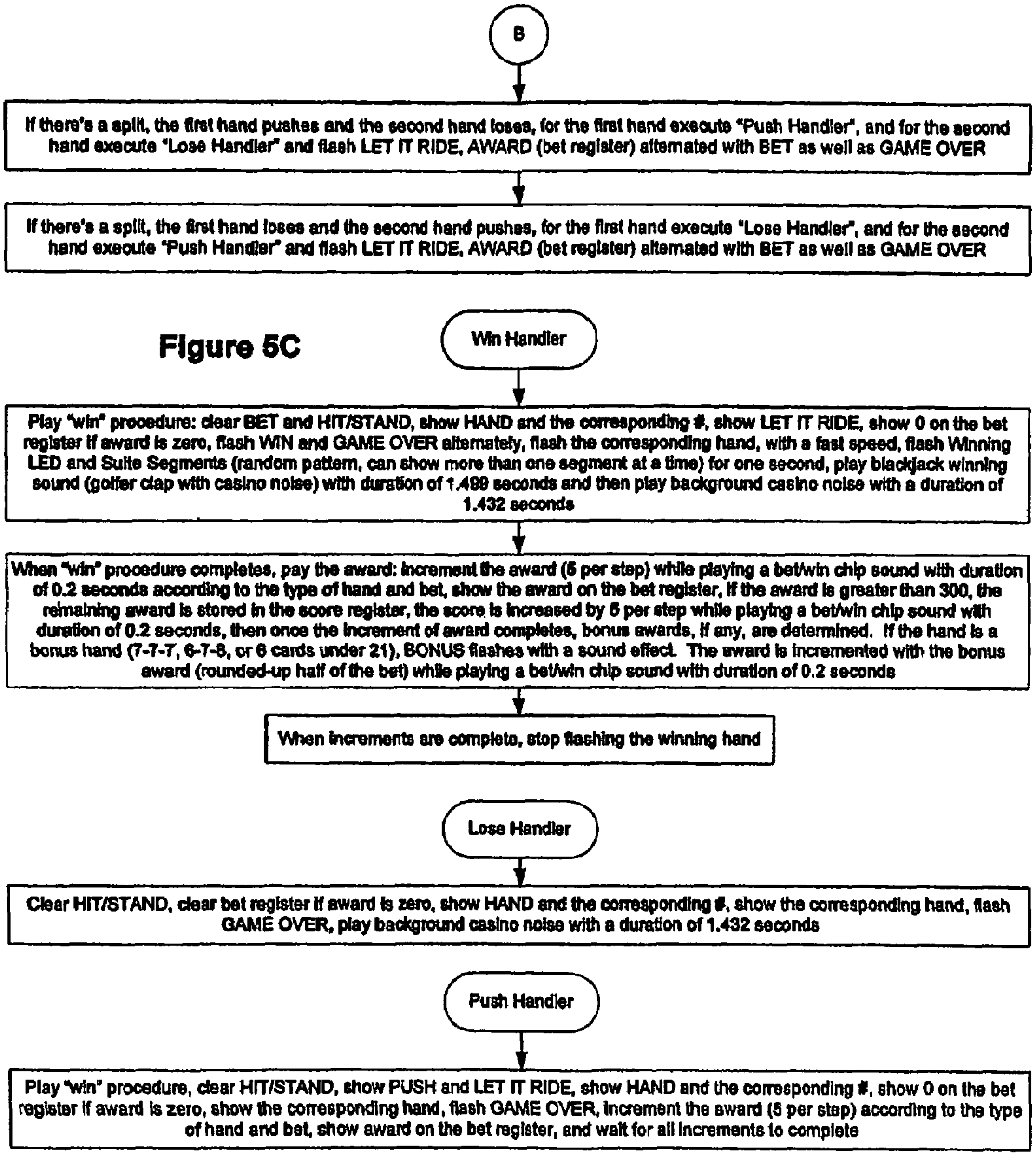
Figure 5D:
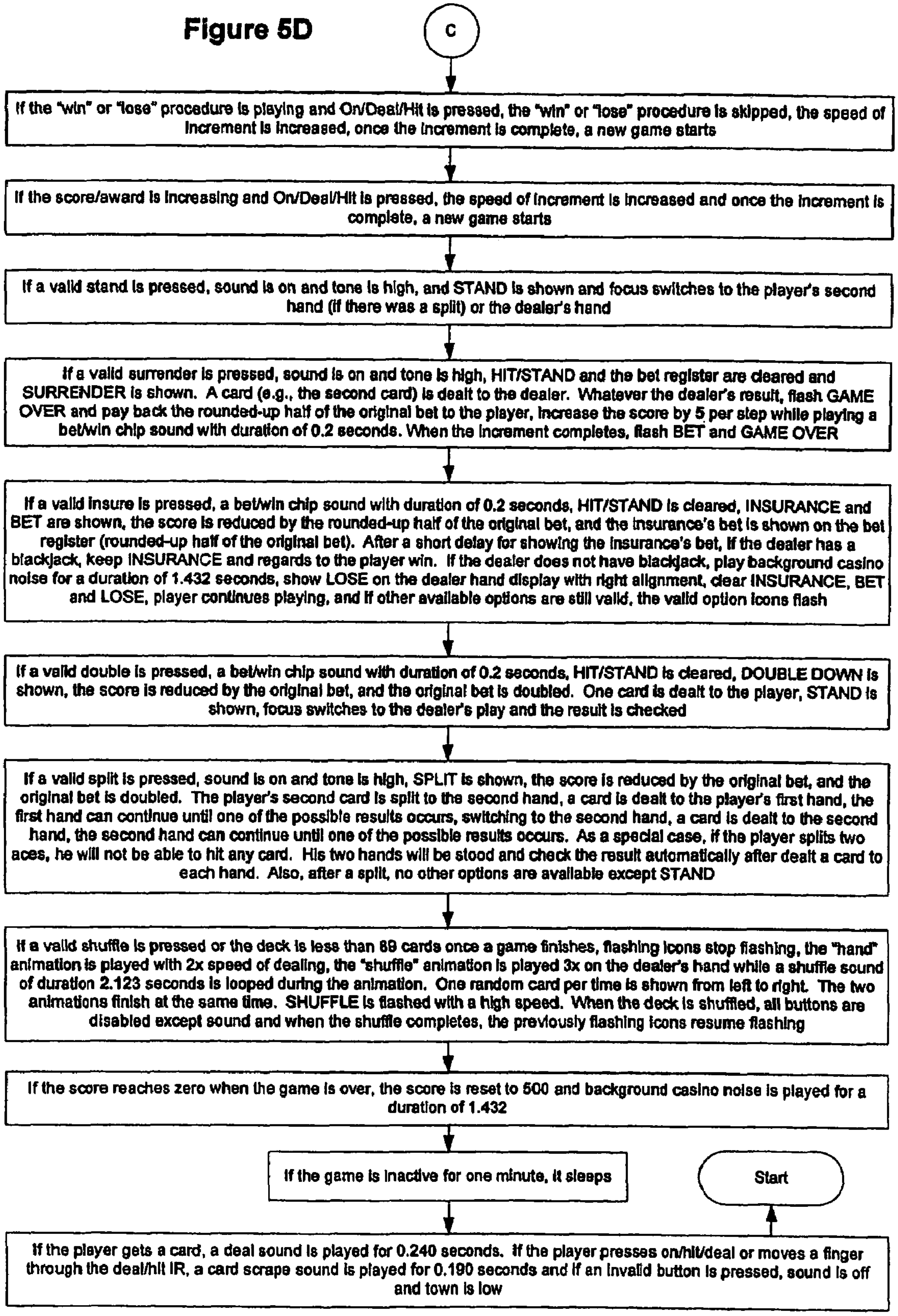

As shown in FIGS. 4A-B, the sensors are positioned such that motion that triggers just sensor 44 or sensor 44 first, in combination with sensor 42 and/or 46, initiates a first response from the circuitry; for example, the circuitry will construe this action as the player wanting to be "hit" or in other words receive an additional card from the dealer. When receiving an additional card, the circuitry or processor 39 is randomly selecting one of at least two alternatives. That is, in response to the "hit" request from the player the microprocessor or circuit 29 will randomly display another card on the LCD.

If the sensors sense motion over sensor 42 first, sensor 44 and then 46 or in the opposite order, 46, 44 then 42 the circuit or microprocessor initiates a second response; for example, the circuitry will construe this action as the player requesting to "stand", or in other words keep the current cards and continue play without receiving any additional cards.

If the sensors sense any other motion, such as sensor 42 or 46 by themselves or any combination of two of the sensors, other than the specification combinations above, the microprocessor will do nothing and look for additional motion. It is noted however that this configuration and ordering of sensor activation is exemplary only and this invention is intended to include any combination of activation of one, two, three or more sensors to achieve the desired output or action in an electronic game.

In another embodiment, the device 10 can have only two sensors (e.g. sensors 42 and 44), which works in substantially similar manner to the embodiment described above. However, a hit is activated be the activation of only one sensor (in such a case it can be specifically one sensor (e.g. 44), or activation of either sensor (e.g, 42 or 44), but not both. To stand, the player must activate both sensors (e.g. 42 and 44) in a predetermined amount of time, in either a specific order (e.g. 42 first) or any order (e.g. 42 or 44 first). This embodiment is merely exemplary and does not limit the overall game (or this specific embodiment) to having two sensors, and this embodiment and the overall invention can have more or less than two sensors and the sensors can be activated in any manner and/or order suitable. As discussed herein each sensor can be positioned in any suitable position Additionally, the game preferably has two distance sensors 33 and 37, which are preferably infrared (IR) sensors that ensure that the other sensors 42, 44 and 46 are actually sensing a hand or other appropriate object rather than just a change of light, thereby accidentally triggering a "hit" or a "stand". It is noted that it is not necessary to include two distance sensors and that there can be no distance sensors, one distance sensors or two or more distance sensors. The distance sensor(s) (if included) can be positioned in any suitable place or area of the game 10 and can be any suitable sensors or devices.

In the preferred embodiment, the sensors or an appropriate button 35 can be used during game play. For example, one button 35 can be a "hit" button, which will activate the same response as the movement detected by the sensors for a "hit". However, it is noted that it is not necessary to have buttons and sensors, and either or both of these devices in any number, configuration and/or in any combination is suitable for the present invention. Operation FIGS. 5A-D illustrate an exemplary method for playing the preferred embodiment of the present invention, it does not restrict the possible variations of number of buttons/sensors and the possible variations of the positioning thereof disclosed above.

The game 10 is activated or "woken up" by pushing the on/deal/hit button. The player then selects a bet using the bet/ride button, at which time the game will "deal" two cards to the player and one card to the "dealer". The cards are displayed on the LCD along with the total of the two cards for the player and the total of the one card to the dealer.

The dealer second card is dealt face down. The player at this time can be "hit" (i.e., receive another card) by tapping or moving a hand over the area where sensor 44 is located or pushing the hit button in the circumferential area, or the player can "stand" (i.e., receive no more cards) by waving a hand over the all three sensors from left or right or right to left or pushing the stand button. If the player stands and the player's cumulative score is not over 21, the dealer shows the second card in the dealer hand at which time the dealer attempts to reach a cumulative score of 21.

The game has many options consistent with casino blackjack. For example, a player can "bust" (go above 21), "push" (tie) with the dealer, spilt the cards in a hand "double down" on the current bet and buy insurance if the dealer's first card is an ace.

It is noted that this invention in not limited to each of the above described options with casino blackjack, with the game of blackjack itself, or with card games in general. The use of sensors and/or buttons to activate, initiate or continue game play is suitable for any game or electronic device desired.

It should be understood that various changes and modifications to the presently preferred embodiments described herein will be apparent to those skilled in the art. Such changes and modifications can be made without departing from the spirit and scope of the present invention and without diminishing its intended advantages. It is therefore intended that such changes and modifications be covered by the appended claims.

The invention is claimed as follows:

1. An electronic game, comprising:

a hand-held housing;

electronic circuitry positioned within said hand-held housing;

a distance sensor electrically coupled to said circuitry;

a first sensor electrically coupled to said circuitry and when activated initiates a first response from said circuitry, only if said distance sensor is activated within a first time period of the activation of said first sensor; and a second sensor electrically coupled to said circuitry and when activated prior to activating said first sensor initiates a second response from said circuitry, only if said distance sensor is activated within a second time period of the activation of said second sensor;

said first and second sensors being light sensors, activatable by a change in environmental lighting, and the distance sensor being a non-contact sensor, not activatable by the change in environmental lighting.

2. An electronic game according to claim 1, further comprising a third sensor.

3. An electronic game according to claim 2, wherein said third sensor is electrically coupled to said circuitry and adapted to be activated subsequent to said first and second sensors to initiated said second response, if said distance sensor is activated within a third time period of the activation of said third sensor.

4. An electronic game according to claim 1, wherein said third sensor is a sensor selected from the group consisting of infrared sensors and light sensors.

5. An electronic game according to claim 1, wherein said electrical circuitry includes a microprocessor.

6. An electronic game according to claim 5, wherein said microprocessor is programmed to randomly select one of at least two alternatives when only the first sensor is activated.

7. An electronic game according to claim 1, further comprising a display unit positioned within said hand-held housing and electrically coupled to said circuitry, said display unit adapted to display at least one of said first and second responses.

8. An electronic card game, comprising:

a housing;

a display disposed within said housing for displaying card images;

electronic circuitry configured to implement the card game and disposed within said housing, said electronic circuitry in electronic communication with said display;

a distance sensor electrically coupled to said circuitry;

a first sensor in electrical communication with said electronic circuitry; and a second sensor in electrical communication with said electronic circuitry;

wherein activation of said first sensor without activation of said second sensor communicates to said electronic circuitry that an additional card is to be displayed on the display, only if said distance sensor is activated within a first time period of the activation of said first sensor, and wherein activation of the second sensor followed by activation of said first sensor, within a predetermined amount of time, communicates that no additional card is to be displayed, only if said distance sensor is activated within a second time period of the activation of said second sensor;

said first and second sensors being sensors being light sensors, the first and second sensors being activatable by a change in environmental lighting, and the distance sensor being configured to send a signal and receive the reflection of said signal, and not activatable by the change in environmental lighting.

9. An electronic card game according to claim 8, wherein said display is an electronic display.

10. An electronic card game according to claim 8, further including a third sensor.

11. An electronic game according to claim 10, wherein said third sensor is electrically coupled to said circuitry and adapted to be activated subsequent to said first and second sensors.

12. An electronic card game according to claim 11, wherein said third sensor is a sensor selected from the group consisting of infrared sensors and light sensors.

13. An electronic card game according to claim 8, wherein said electrical circuitry includes a microprocessor.

14. An electronic card game according to claim 13, wherein said microprocessor is programmed to randomly select one of at least two cards when the first sensor is activated without activation of said second sensor, if said distance sensor is activated within the first time period of the activation of said first sensor.

15. A method of playing an electronic game, the game including electronic circuitry, an electronic display disposed within a housing and in communication with the electronic circuitry, a distance sensor electrically coupled to said circuitry, a first motion sensor and a second motion sensor, each motion sensor in communication with the electronic circuitry and each motion sensor being light sensors, activatable by a change in environmental lighting, and the distance sensor being a non-contact sensor, not activatable by the change in environmental lighting, the method comprising the steps of activating the electronic display;

interpreting the electronic display;

activating the first motion sensor without activating the second motion sensor within a first predetermined amount of time, thereby sending a first signal to the electronic circuitry which in turn initiates a first display, if the distance sensor is activated within a first time period of the activation of the first motion sensor and if it is determined that the activation of the first motion sensor is not due to environmental light change;

and activating the first and the second motion sensors within a second predetermined amount of time, thereby sending a second signal to the electronic circuitry which in turn initiates a second display, if the distance sensor is activated within a second time period of the activation of the second motion sensor and if it is determined that the activation of the second motion sensor is not due to environmental light change.

16. A method according to claim 15, further including activating a third sensor within the second predetermined amount of time, thereby sending the second signal to the electronic circuitry which in turn initiates the second display, if the distance sensor is activated within a third time period of the activation of the third sensor.

17. A method according to claim 15, wherein the interpreting the electronic display step includes interpreting electronically displayed cards.

18. A method according to claim 17, wherein the activating the first motion sensor without activating the second motion sensor within a first predetermined amount of time step includes activating the first sensor such that the first display is a display of a hand in cards.

19. A method according to claim 15, wherein the activating the first motion sensor without activating the second motion sensor within a predetermined amount of time step includes sending the signal to the electronic circuitry such that the electronic circuitry randomly selects one of at least two predetermined displays.

20. An electronic game according to claim 1, wherein the electronic circuitry includes a processor configured to implement the game; and the first response includes a random display of at least one of two alternatives.

21. An electronic game according to claim 1, wherein the electronic circuitry is configured to implement a card game in which a group of cards is displayed;

the first response includes a random display of a card that is added to the group of cards; and the second response is no additional card is added to the group of cards.

22. A method according to claim 15, wherein the electronic circuitry includes a processor; and the step of activating the first motion sensor without activating the second motion sensor within a first predetermined amount of time includes sending a first signal to the processor which in turn initiates a random display of at least one of two alternatives.

23. A method according to claim 22, further comprising the steps of implementing a card game in which a group of cards is displayed; and the first display includes a random display of a card that is added to the group of cards; and the second display includes no additional card added to the group of cards.

* * * * *